US012734737B2

(12) United States Patent
Bosonetto et al.

(10) Patent No.: US 12,734,737 B2
(45) Date of Patent: Sep. 15, 2026

(54) SIDE GATE NOZZLE AND INJECTION MOLD

(71) Applicant: THERMOPLAY S.R.L., Pont St. Martin (IT)

(72) Inventors: Guido Bosonetto, Pont Saint Martin (IT); Flavio Depré, Arnad (IT); Carlo Cocito, San Giusto C. se (IT)

(73) Assignee: THERMOPLAY S.R.L., Pont-Saint-Martin (IT)

( * ) Notice: Subject to any disclaimer, the term of this patent is extended or adjusted under 35 U.S.C. 154(b) by 0 days.

(21) Appl. No.: 18/727,549

(22) PCT Filed: Jan. 4, 2023

(86) PCT No.: PCT/EP2023/050122

§ 371 (c)(1),
(2) Date: Jul. 9, 2024

(87) PCT Pub. No.: WO2023/156080

PCT Pub. Date: Aug. 24, 2023

(65) Prior Publication Data

US 2025/0083367 A1 Mar. 13, 2025

(30) Foreign Application Priority Data

Feb. 16, 2022 (DE) ..................... 10 2022 103 681.2

(51) Int. Cl.
*B29C 45/27* (2006.01)

(52) U.S. Cl.
CPC ................................ *B29C 45/2735* (2013.01)

(58) Field of Classification Search
None
See application file for complete search history.

(56) References Cited

U.S. PATENT DOCUMENTS

| | | | | |
|---|---|---|---|---|
| 7,794,228 | B2 | 9/2010 | Catoen | |
| 8,282,387 | B2 | 10/2012 | Braun | |
| 9,266,270 | B2 * | 2/2016 | Gray | B29C 45/27 |
| 2009/0269430 | A1 * | 10/2009 | Catoen | B29C 45/2735 425/130 |

(Continued)

FOREIGN PATENT DOCUMENTS

| | | | |
|---|---|---|---|
| CA | 2785980 | A1 | 8/2011 |
| DE | 19649621 | A1 | 6/1998 |

(Continued)

OTHER PUBLICATIONS

International Search Report and Written Opinion for International Application No. PCT/EP2023/050122; International Filing Date Jan. 4, 2023; Report Mail Date Apr. 19, 2023 (10 Pages).

*Primary Examiner* — Mohammad M Ameen
(74) *Attorney, Agent, or Firm* — CANTOR COLBURN LLP

(57) ABSTRACT

The disclosure relates to a side gate nozzle comprising a body with at least one slot for receiving at least one tip insert. The nozzle further comprises a tip insert comprising at least one tip element being in a mounted position arranged in the at least one slot and an expander clamping in an expanded position the tip insert with respect to a bottom of the slot and at least one thereto opposite bearing surface arranged at an undercut.

17 Claims, 5 Drawing Sheets

(56) References Cited

U.S. PATENT DOCUMENTS

| | | | |
|---|---|---|---|
| 2024/0116226 A1 | 4/2024 | Cocito et al. | |

FOREIGN PATENT DOCUMENTS

| | | | | |
|---|---|---|---|---|
| DE | 102009048368 | A1 | | 4/2011 |
| EP | 2 447 007 | A1 | * | 5/2012 |
| EP | 2639035 | A1 | | 9/2013 |
| SE | 500650 | C2 | | 8/1994 |

* cited by examiner

SIDE GATE NOZZLE AND INJECTION MOLD

CROSS REFERENCE TO RELATED APPLICATIONS

This application claims priority to PCT/EP2023/050122, filed Jan. 4, 2023, which claims the benefit of German Application No. 10 2022 103 681.2, filed on Feb. 16, 2022, each of which are incorporated by reference in their entirety herein.

FIELD OF THE DISCLOSURE

The present disclosure is directed to a side gate nozzle and a thereto related injection mold for injection molding plastics and other thermoplastic materials.

BACKGROUND OF THE DISCLOSURE

Several side gate nozzles are known from the prior art are described hereinafter.

SE500650C2 was first published in August 1994 in the name of Hans Müller. It relates to an arrangement for side sprue channels, which comprises a number of side outlet openings. The side outlet openings extend laterally from a channel intended for plastified polymer material to flow through. They adjoin mainly radially extending torpedo tips. The torpedo tips are received by a sprue channel base which is releasably connected to the framework of the sprue channels.

DE19649621A1 was first published in June 1998 in the name of EWIKON Heißkanalsysteme GmbH. It relates to an adapter for use with a nozzle manifold of a hot runner injection molding system for fluidly connecting at least two runner sections and thereby distribute and conduct melt to cavities of an injection mold, includes a plug having at least one end face formed with a first opening for fluid connection to one runner section and a cylindrical or conical wall surface formed with a second opening for fluid connection to another runner section and extending at an angle with respect to the one end face, and a force-applying unit so acting upon the plug as to urge the end face and the wall surface into a fluid-tight pressure fit upon mating surfaces of the nozzle manifold.

DE202008005073U1 was first published in August 2007 in the name of EWIKON Heißkanalsysteme GmbH. It relates to a hot runner nozzle for lateral injection of plastic components. The nozzle includes a multi-part nozzle body including at least one tip element which protrudes outwardly over a circumferential area of the nozzle body. The multi-part nozzle body further includes a nozzle body clamping disk section and a nozzle body base section having an axial side that has at least one recess arranged on the axial side to accommodate the at least one tip element.

DE102009048368A1 was first published in April 2011 in the name of HASCO Hasenclever GmbH. It relates to an injection nozzle for guiding melt mass, in particular in a plastic injection mold, by means of which melt mass can be supplied to several mold cavities during an injection molding cycle, wherein the melt mass can be guided from a master channel formed at least partially in the nozzle body into at least two branch channels, wherein the branch channels are formed at least partially by a nozzle tip which is provided with an outlet opening via which the melt mass can be supplied to the mold cavity, wherein each nozzle tip can be positioned in a bearing seat and can be detachably fastened to the nozzle body by means of at least one retaining element.

CA2785980AA was first published in June 2012 in the name of Husky Injection Molding Systems. It relates to a side gate nozzle assembly having a nozzle body and at least one side gate nozzle tip assembly wherein the nozzle body and the at least one side gate nozzle tip assembly are slidably engaged to each other.

EP2639035A1 was first published in September 2013 in the name of Mold-Masters 2007 Ltd. It relates to an edge-gated injection molding apparatus having an injection manifold assembly for distributing a melt stream of moldable material to a plurality of mold cavities aligned on opposing sides of the injection manifold assembly. The injection manifold assembly includes a plurality of melt outlets with each melt outlet being in fluid communication with a respective mold cavity, and a plurality of biasing components disposed along a centerline of the injection manifold assembly. A nozzle seal is disposed between each injection manifold assembly melt outlet and its corresponding mold cavity. Each biasing component is disposed between a pair of melt outlets and corresponding nozzle seals for biasing the melt outlets and nozzle seals outward from the centerline of the injection manifold assembly toward their respective mold cavities and applying a preload thereto.

DE102019127956A1 published in April 2021 in the name of Thermoplay SPA relates to a side gate nozzle comprising a supply block, a distribution block and a nozzle block interconnected to each other in an axial direction. The nozzle block comprises at least one nozzle recess, in which a nozzle insert is arranged. The nozzle insert is in the axial direction held by an individual set screw directly or indirectly interconnected to the nozzle block.

SUMMARY OF THE DISCLOSURE

From the prior art, side gate nozzles for injection molding comprising several tips are known. The tips, which in the side gate nozzle are usually arranged sideways with respect to the general direction of the side gate nozzle, are in fluid communication with a body of the nozzle. During operation the tips are each interconnected usually via an open gate to a cavity. Each cavity being suitable to receive during production melted plastic material via a tip element to form plastic parts. The tips are typically attached removably at the body of the side gate nozzle to allow replacement of the same. In this case the tips should be attached to the body of the side gate nozzle without leakage and on the other side, they should also provide a sealed connection to the respective gate. A central issue with these types of injection nozzles is maintainability in particular of the removable tip elements, such that downtime in case of maintenance is minimized. At the same time side gate nozzles should be constructed to reduce the potential for error during maintenance to prevent accidental damage thereto.

Known side gate nozzles typically require a complex construction and procedure to attach or remove tip inserts to a body of the respective nozzle while ensuring a sealing connection to the body of the nozzle and the cavity. Often it is not possible to exchange a single tip and it is necessary to loosen or even to remove all tips. Assembly of such nozzles is usually cumbersome.

In difference to the prior art, a side gate nozzle according to the disclosure usually comprises a body with at least one slot for receiving at least one tip insert and a tip insert being in a mounted position arranged in the at least one slot. Due to comparably large contact surfaces improved thermal connectivity can be achieved. Typically, the side gate nozzle comprises at least one so called expander being preferably attached to the tip insert. Said expander clamps in an expanded position the tip insert with respect to a bottom of the slot and at least one thereto substantially opposed bearing surface arranged at an undercut.

Preferably, the expander is at least temporarily interconnected to the tip insert such that the expander is movable together with the tip insert during insertion and/or removal of the tip insert. In difference to the prior art the expander according to the present disclosure usually moves with the tip insert which is relevant when the tip insert is linearly displaceable in the slot as the clamping force is always applied at the same position with respect to the tip insert.

Having an expander for clamping the at least one tip insert between the bottom of the slot and at least one thereto opposite arranged undercut has several advantages. For example, it is ensured, in particular by the undercut, that the tip insert is for removal moved inwardly in the slot towards a center of the side gate nozzle before it can be disengaged from and lifted out of the slot. The same applies in reverse order for the insertion of a tip insert, reducing the risk of damage to the tip insert when engaging/disengaging with a gate. The slot can be configured to act as a linear guiding means for the tip insert with respect to the interconnection to the cavity.

Typically, one expander is foreseen per tip insert to clamp the associated tip insert with respect to the bottom of the slot, however one expander can also clamp two or more tip inserts. Having one expander per tip insert allows an individual clamping of each tip insert and in turn an individual removal. For a high efficiency side gate nozzle, typically two tip inserts are arranged in a common slot, usually facing in opposite directions.

In a preferred variation, the expander comprises a clamping element for engaging in the mounted position with the undercut and clamping in an expanded position the tip insert with respect to the bottom of the slot.

Depending on the field of application, the clamping element is integrally connected to a tip insert body of the tip insert in a deformable manner, in particular at a joint region. This reduces the complexity of assembling the side gate nozzle, since the clamping element can be inserted into the slot together with the tip insert. However, the clamping element can also be formed as a part separate from the tip insert. In this case the clamping element can be indirectly attached to the tip insert body.

The clamping element is preferably expandable by a threaded member arranged in an opening of the clamping element e.g. pressing directly or indirectly against the tip insert body, thereby expanding the clamping element away from the tip insert body, in particular the threaded member formed as a screw or the like. Alternatively, the clamping element can be expandable by a threaded member integrally connected to the clamping element pressing against the tip insert body, thereby expanding the clamping element away from the tip insert body. Depending on the design, threaded member can interact with a thread arranged at the clamping element, in particular the thread is an inner thread arranged in the opening, such that the threaded member presses against a top of the tip insert body for expanding the clamping element away therefrom. However, it is also possible that the threaded member interacts with a thread arranged at the tip insert body for expanding the clamping element away therefrom, in particular when the clamping element is fixedly attached to the threaded member.

For a good maintainability a side gate nozzle should be constructed to ensure a damage free removal and mounting of the delicate tips (tip inserts). Good results are possible, when the bearing surface of the at least one undercut is formed by at least one recess in a side wall of the slot. In some variations, the recess can be formed as a groove for engaging with the clamping element and/or the tip insert body. Preferably the bearing surface is arranged in an upper half of the side wall. However, the bearing surface can also be arranged at an undercut next to the at least one slot. In a preferred variation at least one bearing surface is arranged at an undercut per side wall of the slot. Having an undercut arranged at each side wall allows a symmetric clamping of the tip insert in the mounted position by the expander. Usually the clamping element presses in the expanded position against both bearing surfaces to achieve an even pressing of the tip insert against the bottom of the slot.

For a good guiding of the tip insert, the undercut has a length of more than a third of a total length of a tip insert body of the tip insert and extends along the at least one slot. A damage free insertion of the at least one tip insert is possible, when the bearing surface and the slot form a linear guide for the tip insert, such that during insertion a tilting of the tip insert and therefrom resulting damage is prevented. In particular, the two opposing side walls of the slot form a first two sided guide and the bearing surface in combination with the bottom of the slot form a second two sided guide. This allows to displace the tip insert in an outward direction away from the center of the side gate nozzle during insertion in a precise and linear manner, such that the delicate tip element can engage with the associated gate without being damaged.

It is preferable that the at least one bearing surface is arranged, such that the distance between the bearing surface and the bottom of the slot is essentially equal to the height if the tip insert in an axial direction. To allow for a precise positioning, at least one stop surface is arranged at the bottom of the slot or at a side wall of the slot for engaging with a corresponding surface of the tip insert body and to restrict an outward movement of the tip insert during insertion.

Good performance is possible, when the expander ensures in the expanded position a sealed connection between an outlet of a body melt channel of the body arranged in the bottom of the slot and an inlet of a tip insert melt channel of the tip insert. The tip insert preferably comprises at least one tip, in particular at least one tip element removably attached to a tip insert body of the tip insert, for connecting to a cavity in a sealing manner. During operation melted plastic material can be supplied via said at least one tip element into a thereto fluidly connected cavity of an injection mold via a gate.

Preferably, the outlet of a body melt channel and the inlet of a tip insert melt channel are aligned, in particular concentrically with respect to each other, in the mounted position of the tip insert. This can be achieved by the stop surface defining the position of the tip insert in an outward direction in combination with a spacer defining the position of the tip insert in an inward direction. The spacer can be removably attached to the body of the side gate nozzle. The spacer may at least partially consist of a material with a smaller coefficient of thermal expansion than the material of the body of the side gate nozzle, however various materials are also possible like steel or titanium alloys. Preferably the spacer is arranged at a center of the body of the side gate nozzle, in particular in the slot between two tip inserts.

To allow a compact construction, the slot comprises a clamping section, in particular having a t-slot cross-section, for accommodating a corresponding clamping section of the tip insert in an encompassing manner. In addition, the slot preferably comprises a heat guiding section arranged outwardly from the clamping section of the slot for guiding heat during operation from a heating to a front section of the tip insert. For optimal performance of the side gate nozzle the heating can be arranged at least partially in a groove on the outside of the body of the side gate nozzle to control the temperature of the melt. Preferably the heating comprises at least one meandrous turn between two heat guiding sections of neighboring slots. The heat guiding section preferably has a contour protruding from the body of the side gate nozzle to at least partially encompass the front section of the tip insert. Said contour extends the side walls and/or the bottom of the slot outwardly and provides an increased contact surface for guiding the tip insert during insertion. As a result, heat from the heating is transported to the front section of the tip insert and an optimal heating of the melted material passing through the tip insert during operation and into the cavity can be provided.

Depending on the design, the stop surface in combination with the side walls of the slot and the at least one bearing surface form a seat in the clamping section of the slot, such that the outlet of a body melt channel and the inlet of a tip insert melt channel are aligned, in particular concentrically with respect to each other, in the mounted position of the tip insert. Preferably, the bearing surface is arranged essentially parallel to the bottom of the slot, however other arrangements are possible as well.

If present, the clamping section of the tip insert usually has a lateral width greater than the front section of the tip insert comprising at least one tip. Preferably the lateral width of the front section is less than a lateral width of the clamping section of the slot, such that the tip insert can be inserted into the respective slot with its front section overlapping with the clamping section of the slot. The slot may additionally comprise a receiving section for temporarily receiving the clamping section of the tip insert during insertion. If present, the at least one spacer is arranged in said receiving section.

Preferably the tip insert comprises an actuating contour for an assembly tool. The actuating contour is configured for temporary attachment of the assembly tool to allow a precisely guidable insertion of the tip insert into the mounted position. The actuating contour can be formed by at least one out of the following: a thread, a bayonet, or the like. In a preferred variation the actuating contour is formed as the opening of the clamping element attached to or integrally connected to the tip insert body.

The body of the side gate nozzle as well as the tip insert body can be manufactured by machining it from a block of metal, however good results can be achieved when the body of the side gate nozzle and/or the body of the tip insert are at least partially manufactured by an additive process.

Another aspect of the disclosure is directed to an injection mold typically comprising at least one snorkel and at least one side gate nozzle as described above, wherein the snorkel is fluidly connected to the body, in particular to the melt channel, of the side gate nozzle for supplying during operation melted material to the side gate nozzle.

For an even further increased maintainability, the side gate nozzle is preferably arranged in a frame attachable to a hot runner plate of the injection mold for supporting the side gate nozzle relative to the snorkel. The frame can be formed by support elements for supporting the side gate nozzle relative to the hot runner plate. However, the frame can also be formed by a block having a central opening for accommodating the side gate nozzle therein.

Alternatively, the at least one nozzle can be attached to a carrier plate attachable to the hot runner plate of the injection mold. The snorkel typically protrudes from the hot runner plate, such that the side gate nozzle can be slid thereon to form a fluid connection. This allows a pre-assembly of the side gate nozzle outside of the injection mold, which reduces the downtime in case of maintenance, since a frame with a side gate nozzle mounted therein can be replaced.

The side gate nozzle is preferably spaced apart from the frame or the carrier plate by centering means such that the side gate nozzle can be arranged concentrically with the respective snorkel. The centering means usually comprise at least one spacer fixedly interconnecting the side gate nozzle when installed in the injection mold with frame, or the carrier plate respectively. In a preferred variation three or more spacers are arranged circumferentially distributed between the side gate nozzle and the frame/carrier plate. In addition, the centering means may act as a torque back driving means for preventing harmful rotation of the side gate nozzle body when turning the threaded member interconnected to the expander.

Another aspect of the disclosure is directed to a tip insert for a side gate nozzle as described above. Preferably the tip insert comprises an expander interconnected to a tip insert body of the tip insert. This allows the expander being movable together with the tip insert body during insertion and/or removal of the tip insert.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described disclosure will be more fully understood from the detailed description given herein below and the accompanying drawings which should not be considered limiting to the disclosure described in the appended claims. The drawings are showing:

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
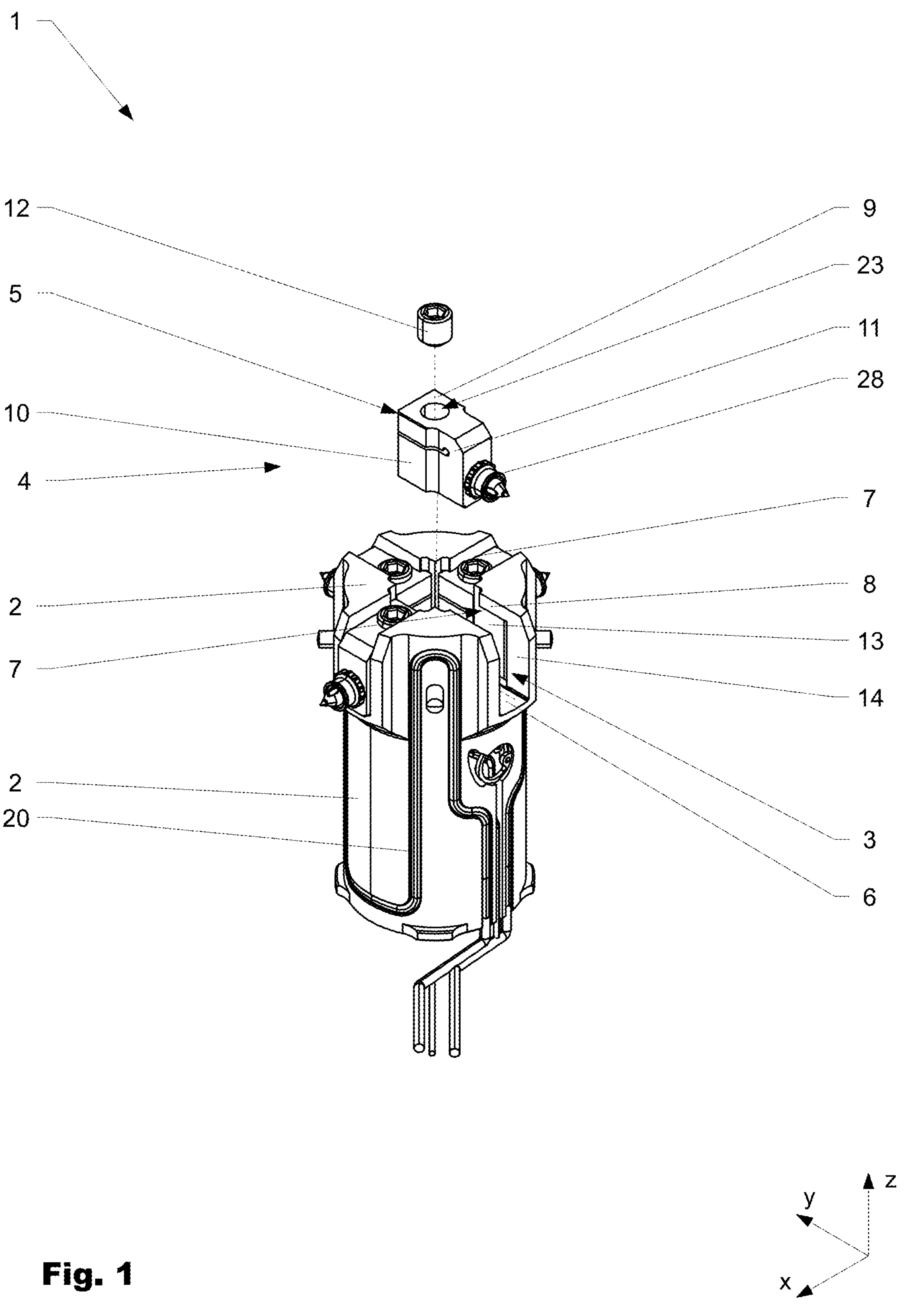
FIG. 1 a partially exploded view of a first variation of a side gate nozzle according to the disclosure.
Figure 2:
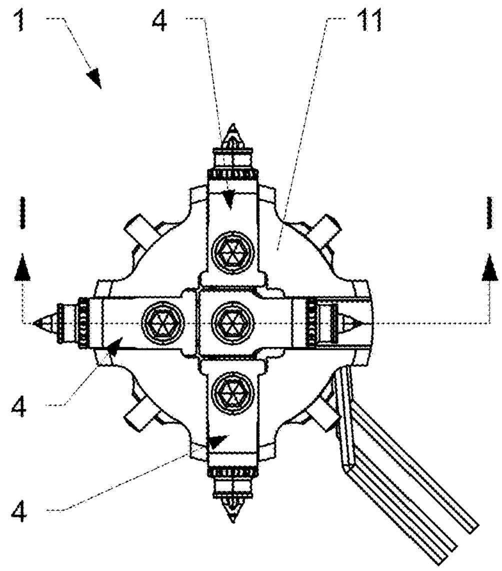
FIG. 2 top view of the first variation of FIG. 1.
Figure 3:
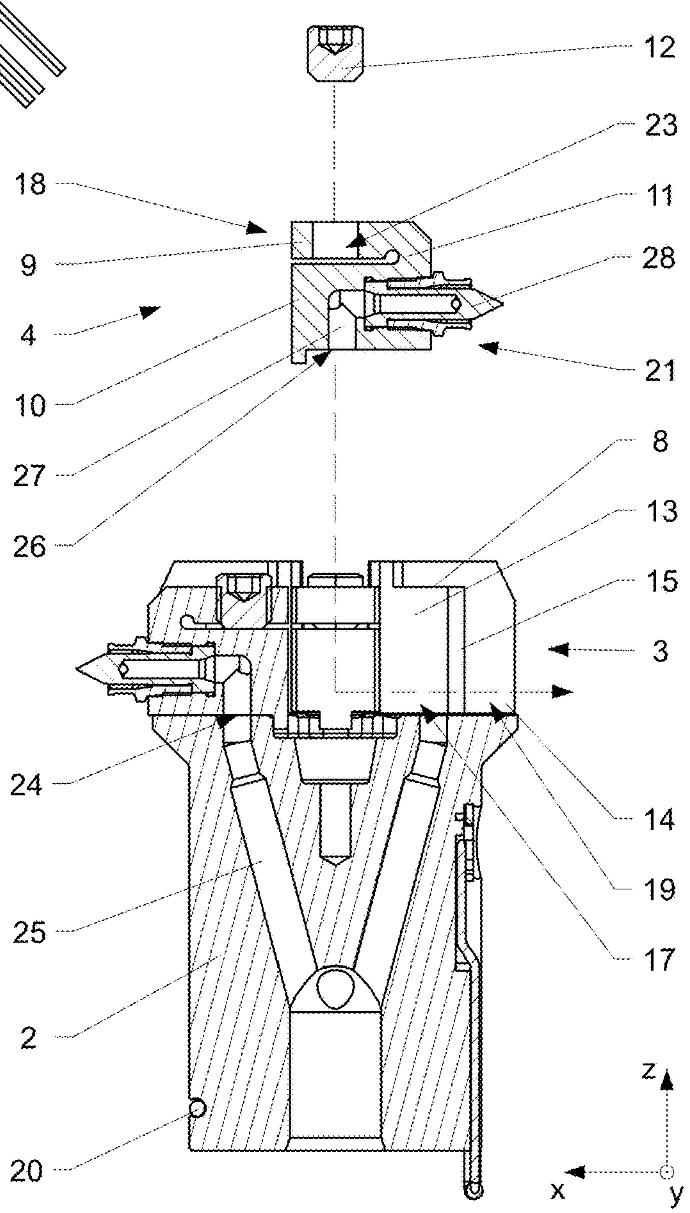
FIG. 3 a sectional view of the first variation of FIG. 1 indicated by section line I.
Figure 4:
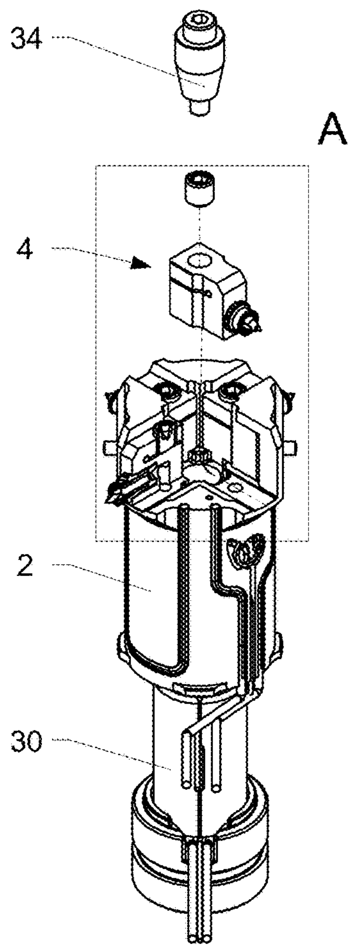
FIG. 4 a partially exploded and sectioned view of the first variation.
Figure 7:
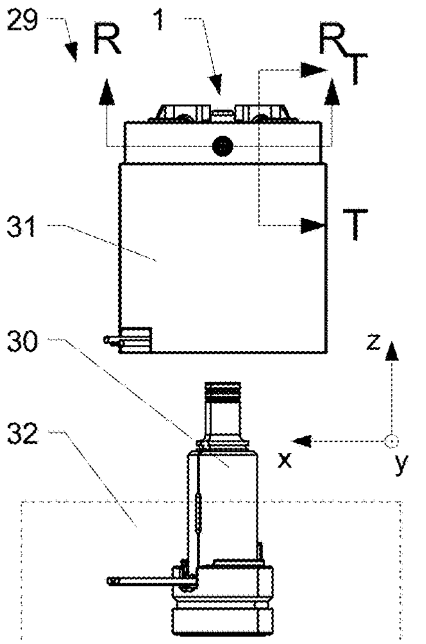
FIG. 7 a side view of a first variation of an injection mold according to the disclosure.
Figure 8:
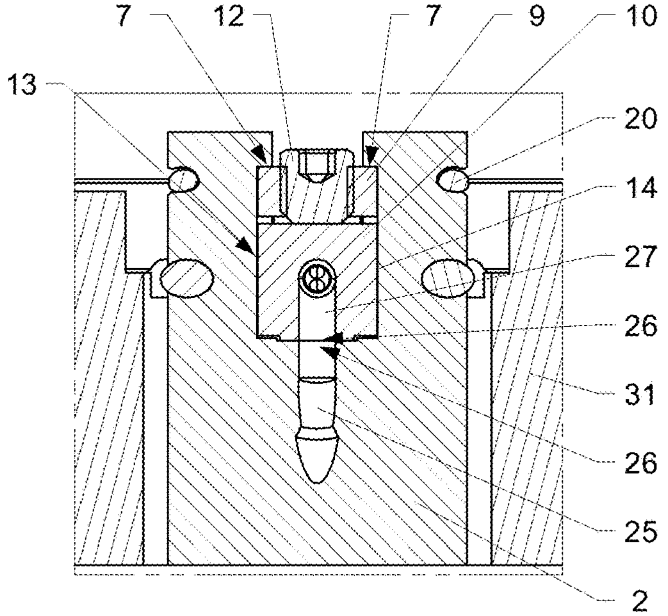
FIG. 8 a sectional view of the first variation of FIG. 7 indicated by section line T.
Figure 9:
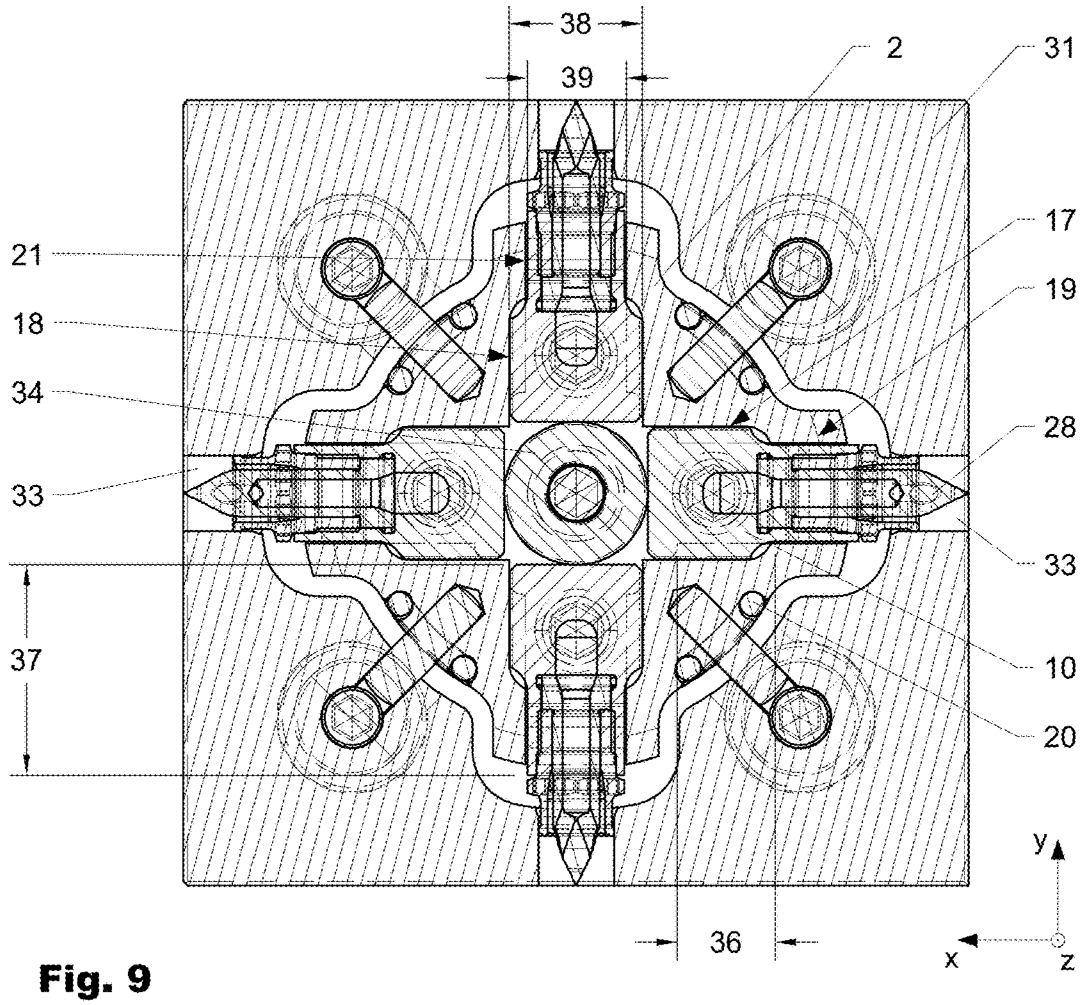
FIG. 9 a sectional view of the first variation of FIG. 7 indicated by section line R.

FIG. 1 shows a partially exploded view of a first variation of a side gate nozzle 1 according to the disclosure. FIG. 2 shows a top view of the first variation of FIG. 1 and FIG. 3 shows a sectional view of the first variation of FIG. 1 indicated by section line I. FIG. 4 is a partially exploded and sectioned view of the first variation and FIG. 5 a detailed view of FIG. 4. FIGS. 6A to 6D illustrate steps of assembly of a tip insert 4 according to the disclosure. In FIG. 7 a side view of a first variation of an injection mold 29 according to the disclosure is visible. FIGS. 8 and 9, respectively show a sectional view, FIG. 8 of the first variation of FIG. 7 indicated by section line T and FIG. 9 of the first variation of FIG. 7 indicated by section line R.

As e.g. visible in FIGS. 1 through 9 a side gate nozzle 1 according to the disclosure usually comprises a body 2 with at least one slot 3 with a tip insert 4 being in a mounted position arranged in the at least one slot 3. During operation melted plastic material can be supplied via said the tip insert 4 into a thereto fluidly connected cavity (not shown) of an injection mold 29 via a gate 33. The side gate nozzle 1 usually comprises at least one expander 5 clamping in an expanded position the tip insert 4 with respect to a bottom 6 of the slot 3 and at least one thereto opposite bearing surface 7 arranged at an undercut 8. As best visible in FIGS. 5 and 8, the expander 5 ensures in the expanded position a sealed connection between an outlet 24 of a body melt channel 25 of the body 2 arranged in the bottom 6 of the slot 3 and an inlet 26 of a tip insert melt channel 27 of the tip insert 4.

Figure 5:
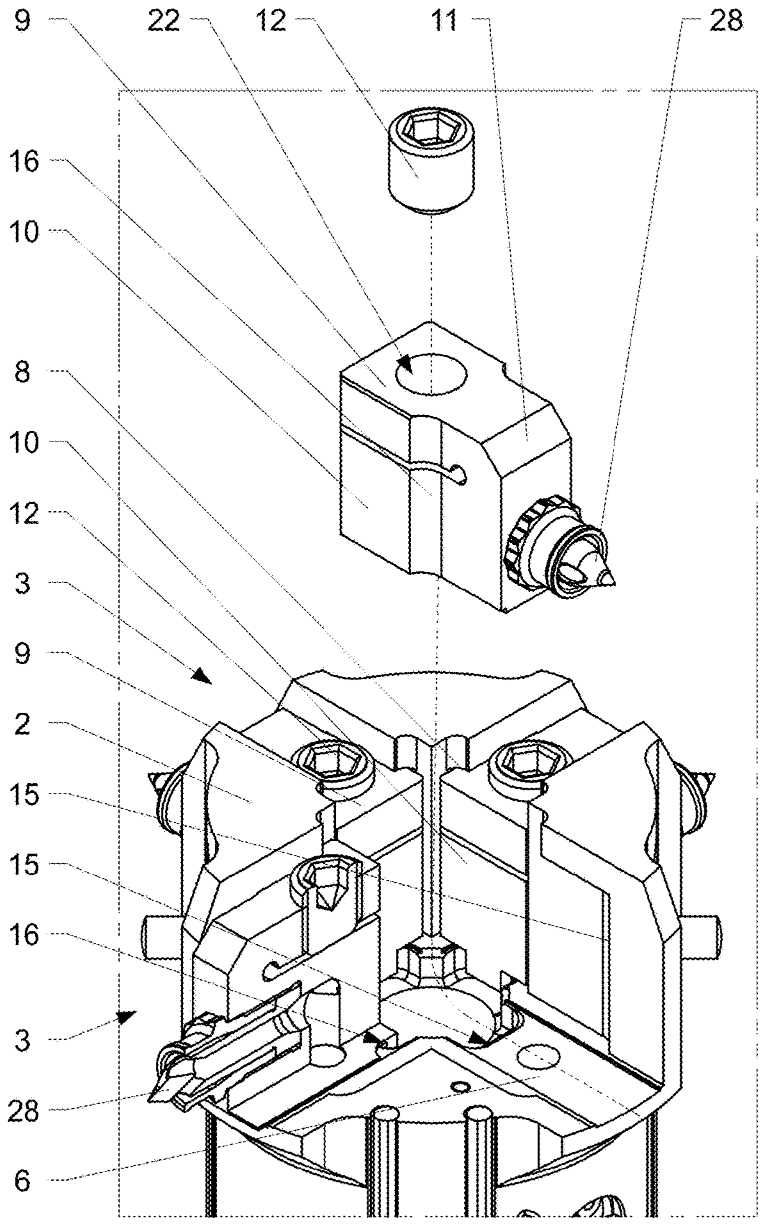
FIG. 5 a detailed view of FIG. 4.

In the shown first variation of the side gate nozzle 1, the expander 5 comprises a clamping element 9 for engaging in the mounted position with the undercut 8 and clamping in an expanded position the tip insert 4 with respect to the bottom 6 of the slot 3. As shown in FIGS. 1, 3 and 5, the clamping element 9 is integrally connected to the tip insert body 10 in a deformable manner by a joint region 11. Here the clamping element 9 provides during insertion of the tip insert 4 a guiding thereof when cooperating with the bearing surface 7 at the undercut 8. In the shown variation the clamping element 9 has an essentially rectangular shape, however other shapes are possible, such as circular shapes.

For expanding the clamping element 9 away from the tip insert body 10, a threaded member, in this case a screw 12, is typically arranged in an opening 23 of the clamping element 9. The screw 12 interacts in the shown variation with an inner thread of the opening 9 to press against tip insert body 10 and in turn the clamping element 9 is pressed against the at least one bearing surface 7. As best visible in FIG. 8, per side wall 14 of the slot 3 an undercut 8 is arranged extending along the slot 3. The undercut 8 can be formed by at least one recess 13 in a side wall 14 of the slot 3. The clamping element 9 presses in the expanded position against the bearing surfaces 7 arranged at the undercuts 8 to achieve an even pressing of the tip insert 4 against the bottom 6 of the slot 3.

As shown in FIGS. 3 and 9, the slot 3 comprises in the first variation a clamping section 17 having a t-slot cross-section, for accommodating a corresponding clamping section 18 of the tip insert 4 in an encompassing manner. The slot 3 usually comprises a heat guiding section 19 arranged in an outward direction from the clamping section 18 of the slot 3 for guiding heat during operation from a heating 20 to a front section 21 of the tip insert 4 comprising at least one tip 28. In the shown variation the tip 28 is formed by a removable tip element 28, which is held with respect to the tip insert body 10 by a gate sealing member screwed into the tip insert body 10.

The lateral width 38 of the clamping section 18 of the tip insert 4 is, as illustrate in FIG. 9, greater than the lateral width 39 of the front section 21 of the tip insert 4. The undercut 8 typically has a length 36 of more than a third of a total length 37 of a tip insert body 10 of the tip insert 4 and extends along the at least one slot 3.

Figure 6A:
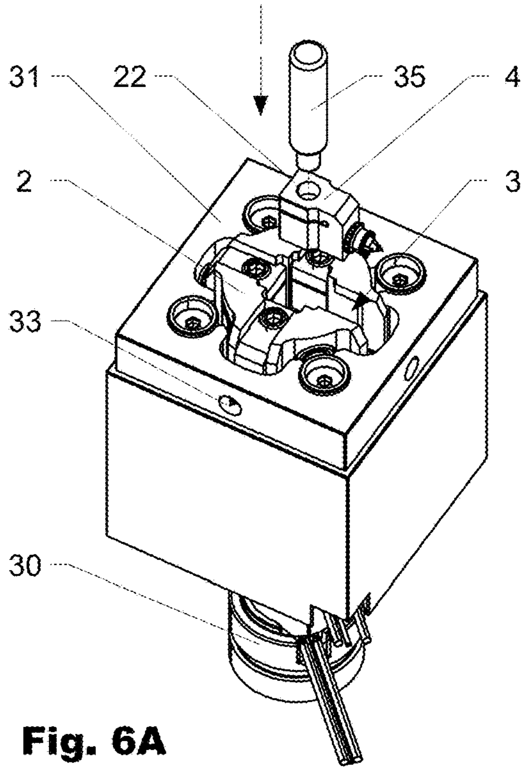
FIG. 6A-D: steps of assembly of a tip insert.
Figure 6B:
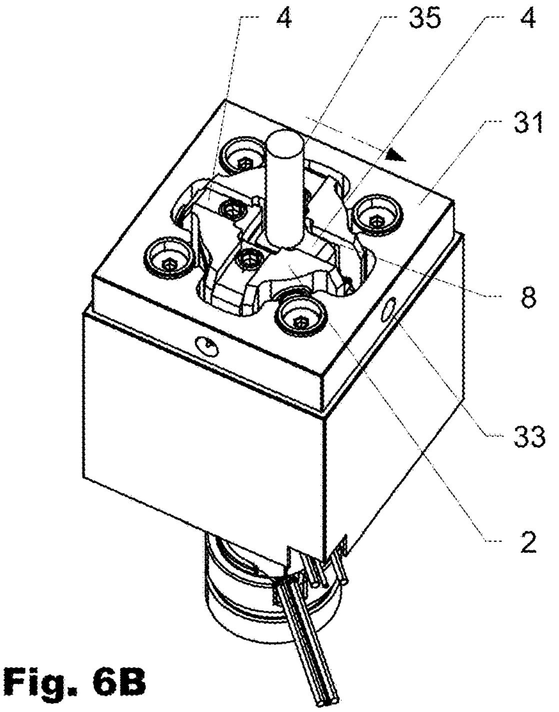
Figure 6C:
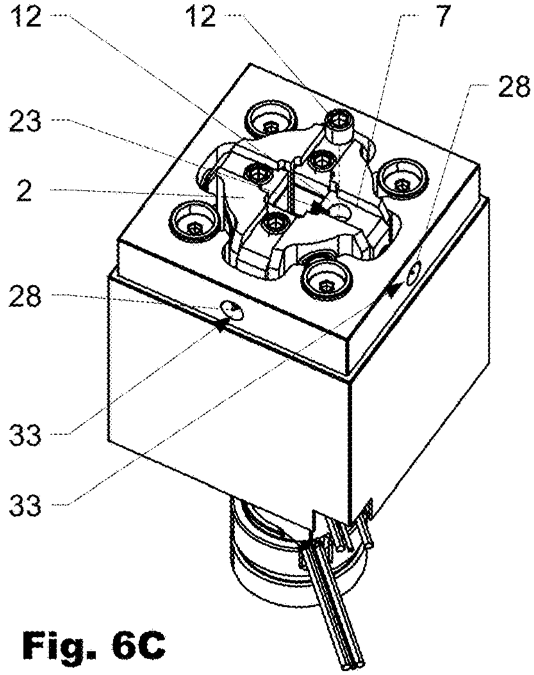
Figure 6D:
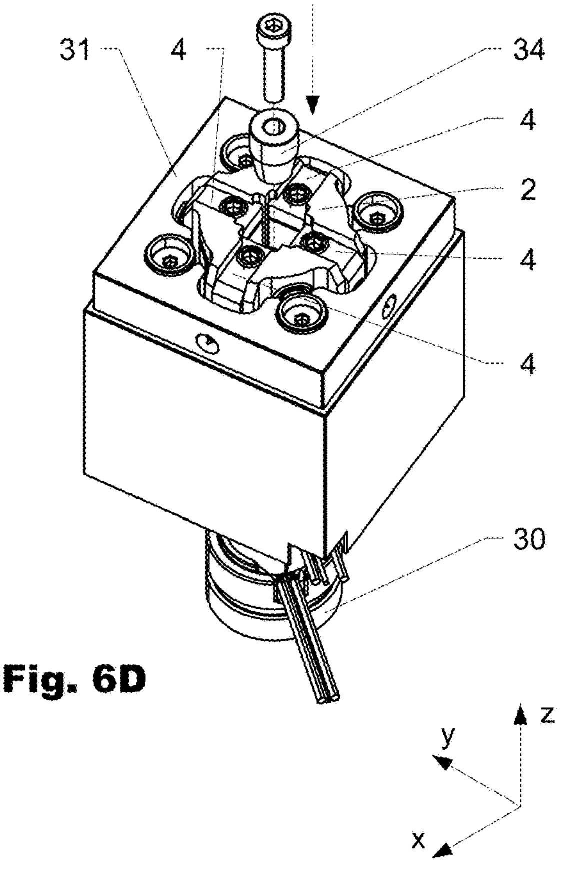

FIGS. 6A to 6D illustrate the steps of inserting a tip insert 4 into the slot 3 of the body 2. To assist the insertion process, the tip insert 4 comprises an actuating contour 22 for an assembly tool 35. In the shown variation the opening 23 in the clamping element 9 having an inner thread acts as the actuating contour 22. Here the assembly tool 35 comprises a corresponding outer thread to be screwed into the opening 23. This is shown in FIG. 6A. Next, the tip insert 4 is lowered into the slot 3 (receiving section) with the front section 21 of the tip insert 4 entering the clamping section 17 of the slot until the tip insert touches down on the bottom 6 of the slot. Following this, as shown in FIG. 6B, the tip insert 4 is moved outwardly until respective stop surfaces 15 arranged at the at each side wall 14 of the slot 3 for engaging with a corresponding surface 16 of the tip insert body 10 stop the movement of the tip insert 4. As visible in FIG. 6C, the screw 12 is installed to expand the clamping element 9 such that the tip insert body 10 is clamped between the bottom 6 and the two bearing surfaces 7. Lastly, a spacer 34 is attached to the body 2 of the side gate nozzle 1 in the slot 3, such that an inward movement of the tip insert 4 is restricted. This is shown in FIG. 6D.

FIG. 7 shows the first variation of an injection mold 29 typically comprising at least one snorkel 30 and at least one side gate nozzle 1 as described above. The snorkel 30 is fluidly connected to the body 2, in particular to the body melt channel 25, of the side gate nozzle 1 for supplying during operation melted material to the side gate nozzle 1. The side gate nozzle 1 is removable from the injection mold 29 for maintenance etc. by disengaging it from the snorkel 30. In the shown variation, the side gate nozzle 1 is arranged in a frame 31 attachable to a hot runner plate 32 of the injection mold 29 for supporting the side gate nozzle 1 relative to the snorkel 30.

Rather, the words used in the specification are words of description rather than limitation, and it is understood that various changes may be made without departing from the scope of the disclosure.

LIST OF DESIGNATIONS

| | |
|---|---|
| 1 | Side gate nozzle |
| 2 | Body (side gate nozzle) |
| 3 | Slot |
| 4 | Tip insert |
| 5 | Expander |
| 6 | Bottom (slot) |
| 7 | Bearing surface (undercut) |
| 8 | Undercut |
| 9 | Clamping element |
| 10 | Tip insert body |
| 11 | Joint region (tip insert body/ clamping element) |
| 12 | Threaded member (screw) |

-continued

| LIST OF DESIGNATIONS | |
|---|---|
| 13 | Recess (side wall/slot) |
| 14 | Side wall (slot) |
| 15 | Stop surface (slot) |
| 16 | (stop) surface (tip insert) |
| 17 | Clamping section (slot) |
| 18 | Clamping section (tip element) |
| 19 | Heat guiding section (slot) |
| 20 | Heating |
| 21 | Front section (tip element) |
| 22 | Actuating contour |
| 23 | Opening (clamping element) |
| 24 | Outlet (body melt channel) |
| 25 | Body melt channel |
| 26 | Inlet (tip insert melt channel) |
| 27 | Tip insert melt channel |
| 28 | Tip/Tip element |
| 29 | Injection mold |
| 30 | Snorkel |
| 31 | Frame |
| 32 | Hot runner plate |
| 33 | Gate |
| 34 | Spacer |
| 35 | Assembly tool |
| 36 | Length (undercut) |
| 37 | Length (tip insert body) |
| 38 | Lateral width (clamping section/tip insert) |
| 39 | Lateral width (front section/tip insert) |

The invention claimed is:

1. A side gate nozzle (1) comprising a. a body (2) with at least one slot (3) for receiving at least one tip insert (4);

b. a tip insert (4) being in a mounted position arranged in the at least one slot (3);

c. an expander (5) clamping in an expanded position the tip insert (4) with respect to a bottom (6) of the at least one slot (3) and at least one thereto substantially opposed bearing surface (7) arranged at an undercut (8);

d. wherein the expander (5) comprises a clamping element (9) for engaging in the mounted position with the undercut (8) and clamping in the expanded position the tip insert (4) with respect to the bottom (6) of the at least one slot (3); and e. wherein the clamping element (9) is expandable by a threaded member (12) arranged in an opening (23) of, or integrally connected to, the clamping element (9) pressing against the tip insert body (10), thereby expanding the clamping element (9) away from the tip insert body (10).

2. The side gate nozzle (1) according to claim 1, wherein the expander (5) is at least temporarily interconnected to the tip insert (4) such that the expander (5) is movable together with the tip insert (4) during insertion and/or removal of the tip insert (4).

3. The side gate nozzle (1) according to claim 1, wherein the clamping element (9) is integrally connected to a tip insert body (10) of the tip insert (4) in a deformable manner at a joint region (11).

4. The side gate nozzle (1) according to claim 1, wherein the bearing surface (7) of the undercut (8) is formed by at least one recess (13) in a side wall (14) of the at least one slot (3), the bearing surface (7) is arranged in an upper half of the side wall (14).

5. The side gate nozzle (1) according to claim 1, wherein the undercut (8) has a length (36) of more than a third of a total length (37) of a tip insert body (10) of the tip insert (4) and extends along the at least one slot (3).

6. The side gate nozzle (1) according claim 1, wherein the bearing surface (7) and the at least one slot (3) form a linear guide for the tip insert (4), such that during insertion a tilting of the tip insert (4) and therefrom resulting damage is prevented.

7. The side gate nozzle (1) according to claim 1, wherein at least one stop surface (15) is arranged at the bottom (6) of the at least one slot or at a side wall (14) of the at least one slot (3) for engaging with a corresponding surface (16) of a tip insert body (10) of the tip insert (4) and to restrict an outward movement of the tip insert (4) during insertion.

8. The side gate nozzle (1) according to claim 1, wherein the at least one slot (3) comprises a. a clamping section (17) having a t-slot cross-section, for accommodating a corresponding clamping section (18) of the tip insert (4) in an encompassing manner; and b. a heat guiding section (19) arranged outwardly from the clamping section (17) of the at least one slot (3) for guiding heat during operation from a heating (20) to a front section (21) of the tip insert (4).

9. The side gate nozzle (1) according to claim 1, wherein the clamping section (18) of the tip insert (4) has a lateral width greater than the front section (21) of the tip insert (4) comprising at least one tip (28).

10. The side gate nozzle (1) according to claim 1, wherein the tip insert (4) comprises an actuating contour (22) for an assembly tool (35).

11. The side gate nozzle (1) according to claim 1, wherein the actuating contour (22) is formed as the opening (23) of the clamping element (9) attached to the tip insert body (10).

12. The side gate nozzle (1) according to claim 1, wherein the body (2) of the side gate nozzle (1) and/or a tip insert body (10) of the tip insert (4) are at least partially manufactured by an additive process.

13. The side gate nozzle (1) according to claim 1, wherein the expander (5) ensures in the expanded position a sealed connection between an outlet (24) of a body melt channel (25) of the body arranged in the bottom (6) of the at least one slot (3) and an inlet (26) of a tip insert melt channel (27) of the tip insert (4).

14. The side gate nozzle (1) according to claim 13, wherein the outlet (24) of the body melt channel (25) and the inlet (26) of the tip insert melt channel (27) are aligned, concentrically with respect to each other, in the mounted position of the tip insert (4).

15. The side gate nozzle (1) according to claim 1, wherein the tip insert (4) comprises at least one tip (28) removably attached to a tip insert body (10) of the tip insert (4), for connecting to a cavity in a sealing manner.

16. The tip insert (4) for the side gate nozzle (1) according to claim 1, wherein the tip insert (4) comprises the expander (5) interconnected to a tip insert body (10) of the tip insert (4).

17. An injection mold (29) comprising at least one snorkel (30) and at least one side gate nozzle (1) according to claim 1, wherein the at least one snorkel (30) is fluidly connected to the body (2) of the side gate nozzle (1) for supplying during operation melted material to the side gate nozzle (1).

* * * * *